US011643188B2

(12) United States Patent
Suzuki et al.

(10) Patent No.: US 11,643,188 B2
(45) Date of Patent: May 9, 2023

(54) AIRCRAFT

(71) Applicant: SUBARU CORPORATION, Tokyo (JP)

(72) Inventors: Kei Suzuki, Tokyo (JP); Iwao Murata, Tokyo (JP); Yuichi Nagai, Tokyo (JP)

(73) Assignee: SUBARU CORPORATION, Tokyo (JP)

(*) Notice: Subject to any disclaimer, the term of this patent is extended or adjusted under 35 U.S.C. 154(b) by 1159 days.

(21) Appl. No.: 16/241,191

(22) Filed: Jan. 7, 2019

(65) Prior Publication Data
US 2019/0300156 A1 Oct. 3, 2019

(30) Foreign Application Priority Data

Mar. 30, 2018 (JP) .............................. JP2018-066691

(51) Int. Cl.
*B64C 13/50* (2006.01)
*B64D 43/00* (2006.01)
*G05D 1/00* (2006.01)

(52) U.S. Cl.
CPC .............. *B64C 13/50* (2013.01); *B64D 43/00* (2013.01); *G05D 1/0055* (2013.01); *B64D 2221/00* (2013.01)

(58) Field of Classification Search
CPC .... B64C 13/50; B64D 43/00; B64D 2221/00; B64D 31/00; G05D 1/0055;
(Continued)

(56) References Cited

U.S. PATENT DOCUMENTS 6,860,452 B2 * 3/2005 Bacon ................. G05D 1/0077
701/4
8,340,793 B2 * 12/2012 Kamenetz .......... G05B 19/0428
714/4.11
(Continued)

FOREIGN PATENT DOCUMENTS

JP 2004-328488 A 11/2004
JP 2005-81891 A1 3/2005
(Continued)

OTHER PUBLICATIONS

Notice of Reasons for Refusal issued in corresponding Japanese Patent Application No. 2018-066691 dated Oct. 29, 2019, with machine translation.
(Continued)

*Primary Examiner* — Muhammad Shafi
(74) *Attorney, Agent, or Firm* — Troutman Pepper Hamilton Sanders LLP

(57) ABSTRACT

An aircraft includes a plurality of control targets, avionics devices and a control switch unit. The control targets each includes a power line communication unit configured to perform communication via a power line. The avionics devices are respectively connected with the control targets via exclusive-use signal lines. The avionics devices are configured to control the control targets via the signal lines. The avionics devices each includes a PLC unit configured to perform communication via the power line. The control switch unit is configured to, when an abnormality occurs in any of the avionics devices, cause another one of the avionics devices to control the control target which has been controlled by the any of the avionics devices, via the power line.

6 Claims, 4 Drawing Sheets

(58) Field of Classification Search
CPC .............. G06F 11/3013; G06F 11/2041; G06F 11/2097; G06F 11/3058
USPC ........................................................ 244/228
See application file for complete search history.

(56) References Cited

U.S. PATENT DOCUMENTS

| | | | | |
|---|---|---|---|---|
| 2003/0127569 | A1* | 7/2003 | Bacon .................. | B64C 13/505 244/195 |
| 2004/0195460 | A1* | 10/2004 | Sailer ...................... | G05B 9/03 714/E11.069 |
| 2007/0164166 | A1* | 7/2007 | Hirvonen .............. | B64C 13/504 244/175 |
| 2014/0032960 | A1* | 1/2014 | Konishi .............. | G06F 11/2033 714/6.3 |

FOREIGN PATENT DOCUMENTS

| | | |
|---|---|---|
| JP | 2006-309439 A1 | 11/2006 |
| JP | 2008-259124 A1 | 10/2008 |
| JP | 2010-27062 A | 2/2010 |
| JP | 2014-026321 A1 | 2/2014 |

OTHER PUBLICATIONS

Notice of Reasons for Refusal issued in corresponding Japanese Patent Application No. 2018-066691 dated Feb. 4, 2020, with machine translation.

* cited by examiner

AIRCRAFT

CROSS-REFERENCE TO RELATED APPLICATIONS

The present application claims priority from Japanese Patent Application No. 2018-066691 filed on Mar. 30, 2018, the entire contents of which are hereby incorporated by reference.

BACKGROUND

1. Technical Field

The present invention relates to an aircraft on which avionics devices are mounted.

2. Related Art

Aircrafts have a high degree of freedom in space traveling and make a high traveling speed. Therefore, safety during flight, in particular, needs to be taken care of. For instance, during flight, even if a malfunction occurs in avionics devices to individually control components such as engines, the flight should be continued. In view of this, by way of precaution against a malfunction in an avionics device, it is necessary to provide another avionics device on standby to replace the malfunctioning avionics device, and to immediately switch control to the other avionics device after determining that the malfunction has occurred.

For instance, in a known technique, a plurality of controllers are prepared for a flight control system to control an aircraft, and when a main control signal from one of the controllers is not valid, a backup control signal from another one of the controllers replaces the main control signal (see Japanese Unexamined Patent Application Publication (Translation of PCT Publication (JP-T)) No. 2009-523658).

SUMMARY OF THE INVENTION

An aspect according to an aspect of the present invention provides an aircraft including: a plurality of control targets each including a power line communication unit configured to perform communication via a power line; avionics devices respectively connected with the control targets via exclusive-use signal lines, the avionics devices being configured to control the control targets via the signal lines, the avionics devices each including a power line communication unit configured to perform communication via the power line; and a control switch unit configured to, when an abnormality occurs in any of the avionics devices, cause another one of the avionics devices to control the control target which has been controlled by the any of the avionics devices, via the power line.

An aspect according to an aspect of the present invention provides an aircraft including: a plurality of control targets each including a power line communication unit configured to perform communication via a power line; avionics devices respectively connected with the control targets via exclusive-use signal lines, the avionics devices being configured to control the control targets via the signal lines, the avionics devices each including a power line communication unit configured to perform communication via the power line; and circuitry configured to, when an abnormality occurs in any of the avionics devices, cause another one of the avionics devices to control the control target which has been controlled by the any of the avionics devices, via the power line.

DETAILED DESCRIPTION

In the following, some preferred examples of the present invention are described in detail with reference to the accompanying drawings. Note that the following description is directed to illustrative instances of the disclosure and not to be construed as limiting to the present invention. Factors including, without limitation, numerical values, dimensions, shapes, materials, components, positions of the components, and how the components are coupled to each other are for purposes of illustration to give an easier understanding of the present invention, and are not to be construed as limiting to the present invention, unless otherwise specified. Further, elements in the following instances which are not recited in a most-generic independent claim of the disclosure are optional and may be provided on an as-needed basis. The drawings are schematic and are not intended to be drawn to scale. Throughout the specification and the drawings, elements having substantially the same function and configuration are denoted with the same minerals to avoid redundant description. Illustration of elements that are not directly related to the present invention is omitted.

Insofar as a plurality of avionics devices are redundantly prepared for each control target such as an engine, even if a malfunction occurs in one of the avionics devices, the control target may be continuously controlled by another avionics device on standby. However, providing each of a large number of control targets required for flight with a plurality of avionics devices increases the cost, occupied volume, and weight of the aircraft.

When the control targets and the plurality of avionics devices are all connected by signal lines, not only disposition of the signal lines but also switching of the signal lines between the avionics devices at the time of malfunction becomes complicated.

It is desirable to provide an aircraft capable of appropriately guaranteeing safety while reducing an increase of the number of avionics devices.

Figure 1:
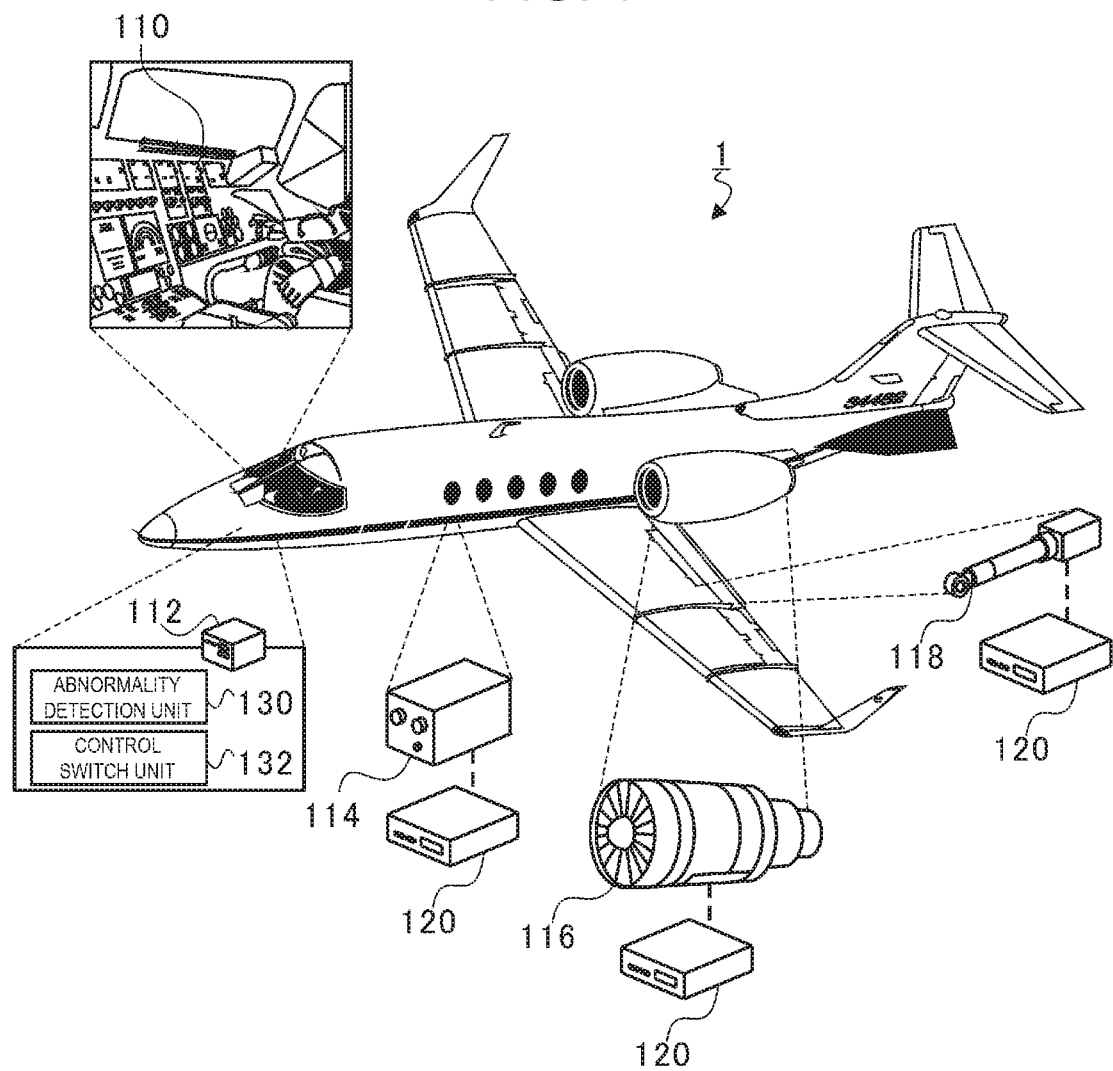
FIG. 1 is an explanatory diagram illustrating a schematic configuration of an aircraft.

FIG. 1 is an explanatory diagram illustrating a schematic configuration of an aircraft 1. The aircraft 1 includes a piloting device 110, a flight controller 112, flight condition sensors 114, motive power mechanisms 116, attitude mechanisms 118, and avionics devices 120.

The piloting device 110 receives an operational input by a pilot in charge of flying the aircraft 1 and transmits the input to the flight controller 112. For instance, when a yoke having a steering-wheel shape in the piloting device 110 is inclined forward or backward, an actual operation amount of the yoke is transmitted to the flight controller 112 to eventually cause the attitude mechanisms 118 to change an attitude of the aircraft.

The flight controller 112 is implemented by semiconductor integrated circuits including, for instance, a central processing unit (CPU), a ROM storing programs and such data, and a RAM serving as a work area. Using the avionics devices 120, the flight controller 112 makes the aircraft 1 fly, and manages and controls the whole aircraft 1. As described later, the flight controller 112 cooperates with the programs and serves as an abnormality detection unit 130 and a control switch unit 132 as well. These functional units will be detailed later.

The flight condition sensors 114 are disposed outside and inside of the aircraft 1 and each detects present flight conditions such as a flying position (including a longitude, a latitude, and an altitude), a speed, and an attitude (Inertial Measurement Unit (IMU)) of the aircraft, a direction and a speed of wind received by the aircraft, and an atmospheric pressure, a temperature, and a humidity around the aircraft.

The motive power mechanisms 116 each includes an internal combustion engine (such as a jet engine or a reciprocating engine) to obtain thrust. The thrust generates lift around fixed-wings secured to a fuselage so as to maintain the fuselage in a floating state in the air. It should be noted that mechanisms to generate lift are not limited to this instance. The fuselage may obtain lift and thrust using rotary-wings (rotors) disposed rotatably.

The attitude mechanisms 118 are implemented by actuators to displace ailerons and elevators of the aircraft 1. The attitude mechanisms 118 cause the ailerons and the elevators to adjust, for instance, a bank angle (rolling angle) and an aircraft nose angle (pitch angle) so as to also change a flying direction (yaw angle), an altitude, and a flying speed (that is, to perform flight control).

A plurality of avionics devices 120 are provided to respectively correspond to a plurality of control targets such as the flight condition sensors 114, the motive power mechanisms 116, and the attitude mechanisms 118. For instance, avionics devices 120 corresponding to the flight condition sensors 114 individually control and enable the flight condition sensors 114 to detect flight conditions, and transmit the flight conditions obtained by the flight condition sensors 114 so that the flight controller 112 grasps the flight conditions. Avionics devices 120 corresponding to the motive power mechanisms 116 individually control the motive power mechanisms 116 to appropriately maintain thrust of the aircraft 1 in response to a command from the flight controller 112. Avionics devices 120 corresponding to the attitude mechanisms 118 individually control the attitude mechanisms 118 to appropriately maintain the attitude of the aircraft 1 in response to a command from the flight controller 112.

As described above, the avionics devices 120 are crucial elements to directly and individually control the respective control targets such as the flight condition sensors 114, the motive power mechanisms 116, and the attitude mechanisms 118. In view of this, by way of precaution against a malfunction in an avionics device 120, the aircraft 1 has another avionics device 120 provided on standby to replace the avionics device 120 and switches the avionics device 120 to the other avionics device 120 immediately after determining that the malfunction has occurred. However, providing each of such control targets with a plurality of avionics devices 120 increases the cost, occupied volume, and weight of the aircraft. In the case where the control targets and the plurality of avionics devices are merely connected by signal lines, not only disposition of the signal lines but also switching of the signal lines between the avionics devices at the time of malfunction becomes complicated. It is therefore desirable to appropriately guarantee safety of the aircraft while reducing an increase of the number of the avionics devices 120.

Figure 2:
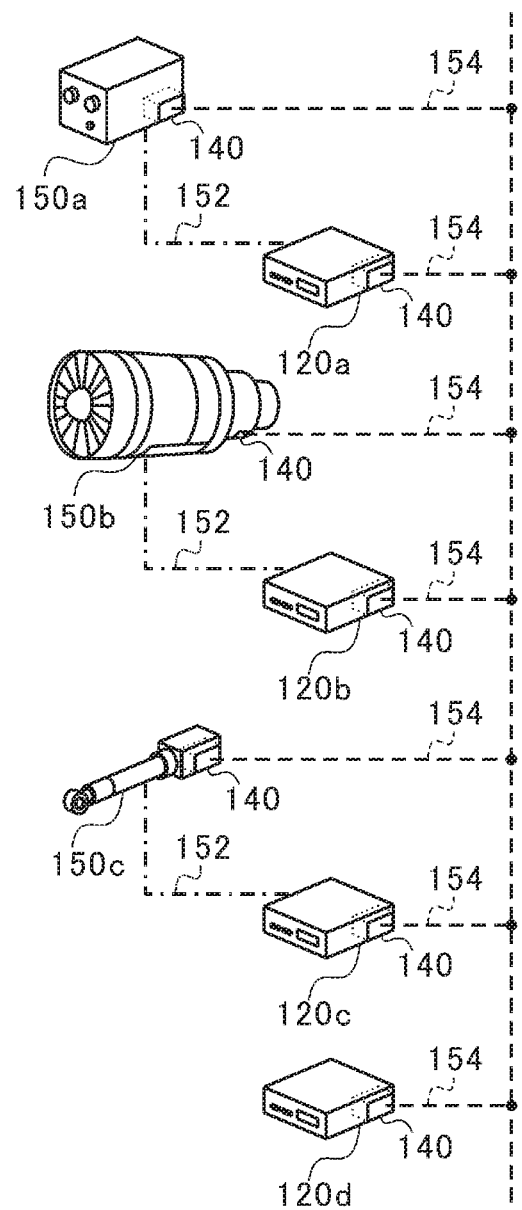
FIG. 2 is an explanatory diagram illustrating redundancy of avionics devices.

FIG. 2 is an explanatory diagram illustrating redundancy of the avionics devices 120. Here, for the convenience of description, among the plurality of control targets, three control targets, that is, an IMU as the flight condition sensor 114, an engine as the motive power mechanism 116, and an actuator as the attitude mechanism 118, are taken as instances and will be described in this order as a control target 150a, a control target 150b, and a control target 150c.

In FIG. 2, avionics devices 120 (120a, 120b, and 120c) are disposed to respectively correspond to the three control targets 150a, 150b, and 150c, that is, the IMU, the engine, and the actuator. The control targets 150a, 150b, and 150c are respectively connected with the avionics devices 120a, 120b, and 120c by exclusive-use signal lines 152 indicated by single chain lines in FIG. 2. The avionics devices 120a, 120b, and 120c respectively control the control targets 150a, 150b, and 150c via the signal lines 152.

Power is supplied to the control targets 150a, 150b, and 150c and the avionics devices 120a, 120b, and 120c via a common power line 154 indicated by dashed lines in FIG. 2, for operation. Consequently, the control targets 150a, 150b, and 150c and the avionics devices 120a, 120b, and 120c may be considered to be all electrically connected via the power line 154.

The control targets 150a, 150b, and 150c and the avionics devices 120a, 120b, and 120c each includes a PLC unit 140 to perform power line communication (PLC) via the power line 154. It should be noted that the PLC unit 140 serves as a modem and transmits and receives data to and from other PLC units 140. Here, the PLC is a technique of utilizing power lines as communication lines to superpose communication signals on the power to transmit information by a modulation method such as an orthogonal frequency division multiplex (OFDM) method or a spread spectrum (SS) modulation method. The power in this case refers to both direct-current (DC) power and alternating-current (AC) power. Various existing techniques are applicable to connection arrangement of the PLC. Consequently, the connection arrangement will not be elaborated here.

In this example, in addition to the avionics devices 120a, 120b, and 120c, a backup avionics device 120d is also connected with the power line 154. The backup avionics device 120d includes a PLC unit 140 in substantially the same manner as the avionics devices 120a, 120b, and 120c. It should be noted that this avionics device 120d is not connected with any of the control targets 150a, 150b, and 150c via the signal line 152. That is, the avionics device 120d is connected with the control targets 150a, 150b, and 150c only via the power line 154.

The abnormality detection unit 130 of the flight controller 112 continuously monitors the avionics devices 120 and detects an abnormality in the avionics devices 120. When an abnormality occurs in one of the three avionics devices 120a, 120b, and 120c, for instance, in the avionics device 120a connected with the control target 150a via the signal line 152, the abnormality detection unit 130 detects the abnormality. Then, the control switch unit 132 of the flight controller 112 switches the avionics device 120a having the abnormality to the backup avionics device 120d.

Figure 3A:
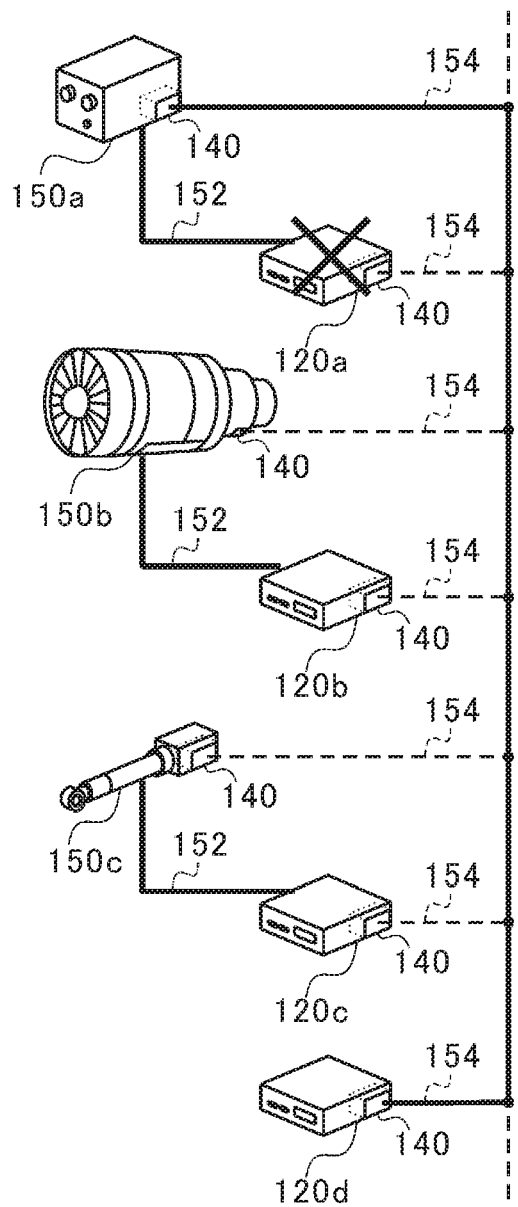
FIGS. 3A and 3B are explanatory diagrams illustrating processing by a control switch unit.
Figure 3B:
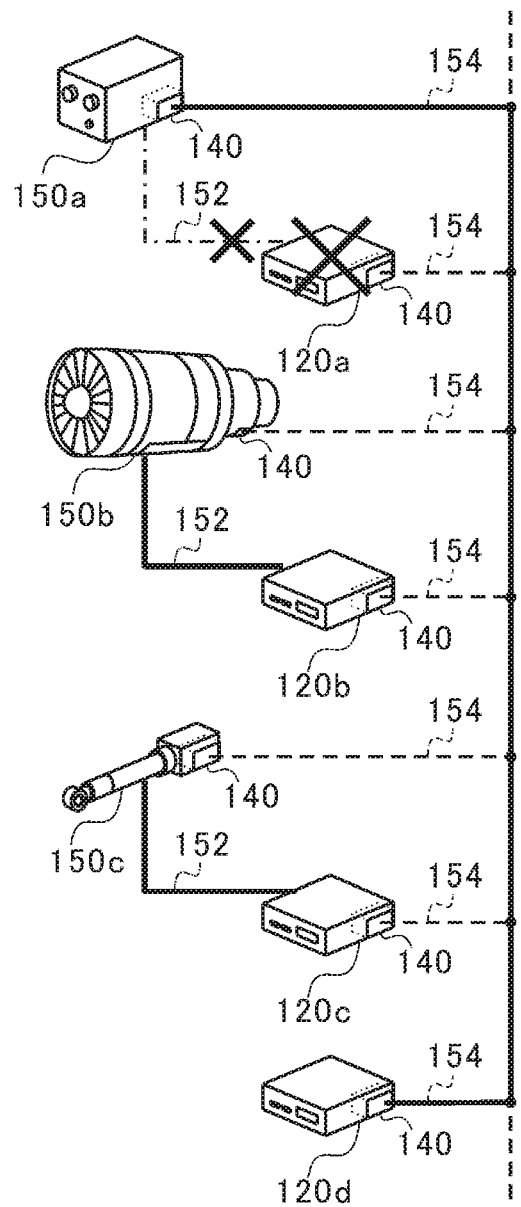

FIGS. 3A and 3B are explanatory diagrams illustrating processing by the control switch unit 132. Here, it is assumed that communicable connection has been established via the signal lines 152 between the control target 150a and the avionics device 120a, between the control target 150*b* and the avionics device 120*b*, and between the control target 150*c* and the avionics device 120*c*, as indicated by solid lines in FIG. 3A.

When the abnormality detection unit 130 detects the abnormality in the avionics device 120*a*, the control switch unit 132 causes the avionics device 120*d*, which has not been connected with any of the control targets 150*a*, 150*b*, and 150*c* via the signal line 152, to be in communicable connect with the control target 150*a* via the power line 154, as illustrated in FIG. 3A. At this time, as indicated by the solid lines in FIG. 3A, the control target 150*a* is in communicable connect with the avionics device 120*a* via the signal line 152, and is in communicable connect with the avionics device 120*d* via the power line 154.

Then, as illustrated in FIG. 3B, the control switch unit 132 switches a device that controls the control target 150*a* from the avionics device 120*a* to the avionics device 120*d*. That is, the control switch unit 132 causes the avionics device 120*d* to control the control target 150*a*, which has been controlled by the avionics device 120*a*, via the power line 154.

Therefore, all the programs (applications) are stored so that while the avionics device 120*d* is not connected with any of the control targets 150*a*, 150*b*, and 150*c* via the signal line 152, the avionics device 120*d* is capable of controlling all of the control targets 150*a*, 150*b*, and 150*c*. In this example, the programs are stored in advance. Alternatively, after determining which control target to control, only a program concerning the determined control target may be downloaded.

It should be noted that in this example, the PLC implements synchronicity among the devices (such as the control targets 150*a*, 150*b*, and 150*c*, and the avionics devices 120*a*, 120*b*, 120*c*, and 120*d*) as described below. For instance, timings at which the PLCs perform communication are scheduled to implement communicable connect among the devices. Specifically, one device is determined to be an administrator, and the administrative device transmits synchronicity signals in addition to data so as to synchronize data transmission and reception timings of the devices. The devices may be enabled to communicate with one another only in response to a command from the administrative device. In this manner, data transmission and reception timings among the devices are synchronized. At this time, naturally, the administrative device is also capable of communicating with each of the devices.

Such data synchronization makes it possible to secure synchronicity of information in, for instance, grasping information required for the flight and outputting a result of processing by each of the devices.

In this example, the backup avionics device 120*d* to guarantee redundancy is connected with the control targets 150*a*, 150*b*, and 150*c* via the power line 154, with which connection is essential to receive power supply. Therefore, the avionics device 120*d* does not need individual signal lines 152 to be connected with the control targets 150*a*, 150*b*, and 150*c*. As a result, even if the avionics device 120*d* is added, the arrangement does not become complicated.

In this example, the control targets 150*a*, 150*b*, and 150*c* each has at least two communication routes, that is, the signal line 152 and the power line 154. With this configuration, even if a malfunction occurs in any of the avionics devices 120*a*, 120*b*, and 120*c* which is in communicable connect with a control target via the signal line 152, communicable connection may be established between the new avionics device 120*d* and the control target via the power line 154 without disconnecting the signal line 152. Therefore, even if a malfunction occurs in any of the avionics devices 120*a*, 120*b*, and 120*c*, the any of the avionics devices 120*a*, 120*b*, and 120*c* is easily switched to the avionics device 120*d* without using an exclusive-use switch device.

In this example, there is no need to prepare backup avionics devices for the plurality of avionics devices 120*a*, 120*b*, and 120*c*, respectively. A small number of (for instance, one in this case) avionics devices 120*d* for connection via the power line 154 are only required. Therefore, an increase in the number of the avionics devices 120 is prevented.

As described above, even if a malfunction occurs in any of the avionics devices 120*a*, 120*b*, and 120*c*, insofar as the backup avionics device 120*d* connected with the power line 154 exists in a sound state, switching to the backup avionics device 120*d* makes it possible to continue to control the control targets 150*a*, 150*b*, and 150*c*. However, after switching, there is no guarantee that no malfunction will occur in the backup avionics device 120*d*. In this case, the rest of the avionics devices 120 continue to control the control targets 150*a*, 150*b*, and 150*c*.

Figure 4A:
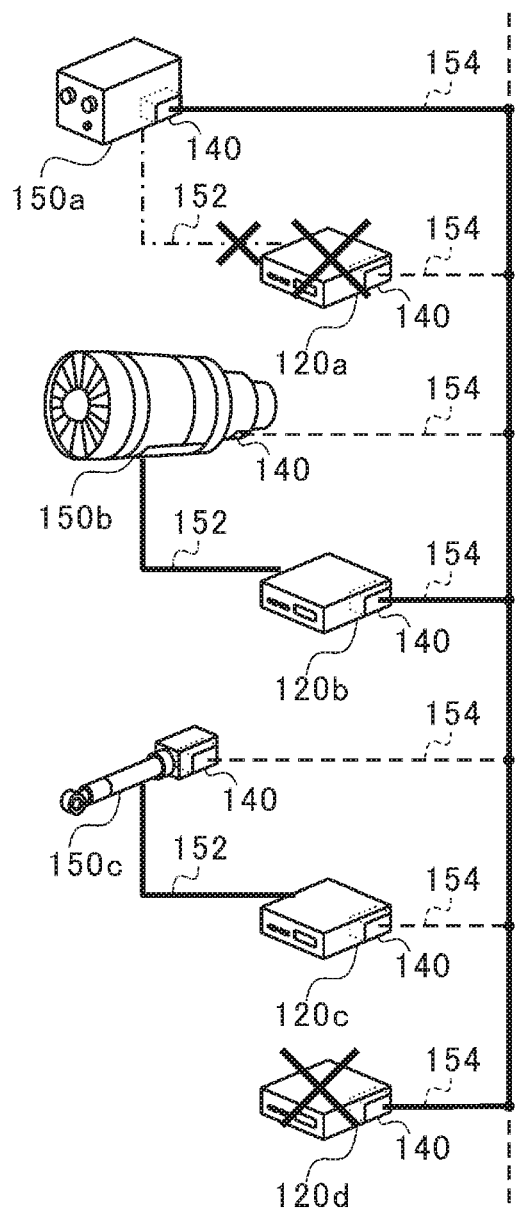
FIGS. 4A and 4B are explanatory diagrams illustrating processing by the control switch unit.
Figure 4B:
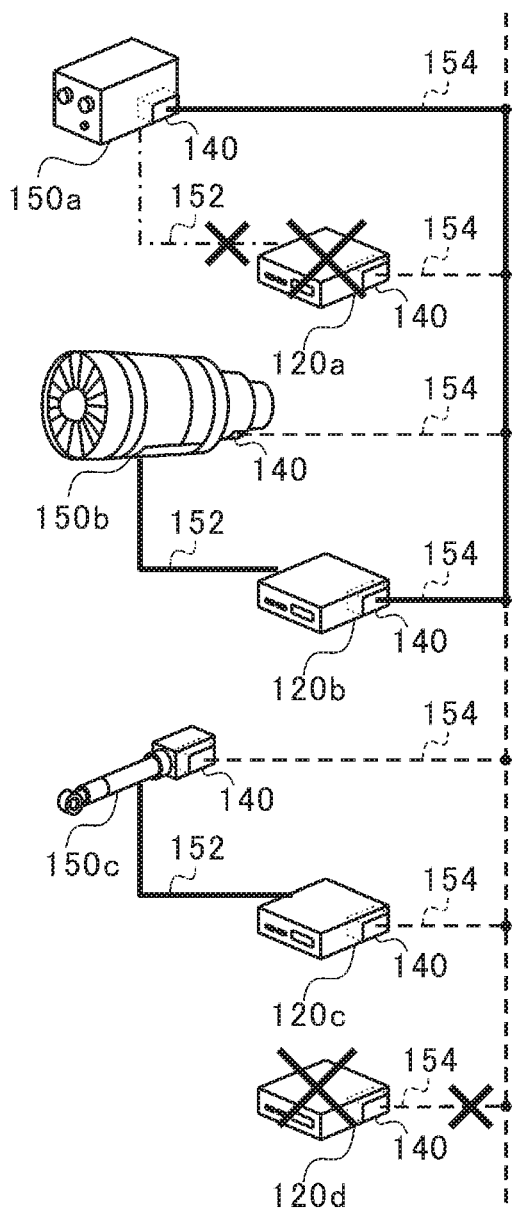

FIGS. 4A and 4B are explanatory diagrams illustrating processing by the control switch unit 132. Here, it is assumed that after detecting the abnormality in the avionics device 120*a* and consequently switching the control so that the avionics device 120*d* controls the control target 150*a* in the manner described with reference to FIGS. 3A and 3B, the abnormality detection unit 130 further detects an abnormality in the avionics device 120*d*.

At this time, the control switch unit 132 determines whether there remains an avionics device 120 which is not connected with any of the control targets 150*a*, 150*b*, and 150*c* via the signal line 152 and which does not control the control targets 150*a*, 150*b*, and 150*c*. When there remains such an avionics device 120, the control switch unit 132 causes the remaining avionics device 120 to control the control target 150*a* via the power line 154, in substantially the same manner as described with reference to FIG. 3B.

When no avionics device 120 remains in the above-described state, the control switch unit 132 determines, from the avionics devices 120*b* and 120*c*, which have been controlling the other control targets 150*b* and 150*c* since before the abnormality detection, the avionics device 120*b* having throughput left in reserve, and the control switch unit 132 establishes communicable connect between the avionics device 120*b* and the control target 150*a* via the power line 154, as illustrated in FIG. 4A.

At this time, the control target 150*a* is in communicable connect with the avionics device 120*d* via the power line 154, and is connected with the avionics device 120*b* via the power line 154. The control target 150*b* is in communicable connect with the avionics device 120*b* via the signal line 152. From another point of view, the avionics device 120*b* is in communicable connect with the control target 150*b* via the signal line 152 and is incommunicable connect with the control target 150*a* via the power line 154.

Then, as illustrated in FIG. 4B, the control switch unit 132 switches a device that controls the control target 150*a* from the avionics device 120*d* to the avionics device 120*b*. That is, the control switch unit 132 causes the avionics device 120*b* to control the control target 150*a* which is in communicable connect with the avionics device 120*d*, via the power line 154.

It should be noted that the avionics device 120*b* is originally designed to appropriately control the control target 150*b*, and that even if a program to control the control target 150a is applied, the avionics device 120b may be incapable of appropriately controlling either of the control target 150a and the control target 150b in some cases depending on the performance of the avionics device 120b. In this case, functions required for the control target 150a and the control target 150b may be limited to the minimum functions required for flight safety. Priorities may be assigned to the control targets 150a, 150b, and 150c, to limit functions having lower priorities and to fulfill functions of higher priorities. This makes it possible to secure safety of the aircraft 1 while controlling a plurality of control targets by a single avionics device 120.

In this example, in substantially the same manner as described with reference to FIGS. 3A and 3B, the avionics device 120b capable of controlling a plurality of control targets is connected with the control targets 150a and 150c via the power line 154, with which connection is essential to receive power supply. Therefore, the avionics device 120b does not need individual signal lines 152 to be connected with the control targets 150a and 150c.

In this example, the control targets 150a, 150b, and 150c are connected with all of the avionics devices 120a, 120b, 120c, and 120d via the power line 154. With this configuration, even if a malfunction occurs in any of the avionics devices 120a, 120b, 120c, and 120d, communicable connection may be established with another one of the avionics devices 120 via the power line 154.

It should be noted that this description concerns an instance in which, in a sound state, the control targets and the avionics devices 120 have a one-to-one correspondence, as illustrated in FIG. 2. When the avionics devices 120 have high performance, a single avionics device 120 may control a plurality of control targets from the start.

A program that causes a computer to function as each control device in the aircraft 1 may be provided. Also, a storage medium that stores the program, such as a computer-readable flexible disc, an optical magnetic disc, a ROM, a CD, a DVD, or a BD, may be provided. Here, the program refers to a data processing unit described in any language or any description method.

The preferred example of the present invention has been described with reference to the accompanying drawings. It should be noted that examples of the present invention are not limited to such an example. It is apparent to those skilled in the art would conceive various modifications and changes within the scope of claims. It is understood that these modifications and changes fall within the technical scope of the present invention.

The example of the present invention is applicable to aircrafts on which avionics devices are mounted.

The invention claimed is:

1. An aircraft comprising:
control targets each comprising a first power line communication unit configured to perform power line communication via a power line;
avionics devices respectively connected with the control targets via exclusive-use signal lines, the avionics devices being configured to control the control targets via the signal lines, the avionics devices each comprising a second power line communication unit configured to perform the power line communication via the power line; and
a control switch unit configured to, based on an abnormality occurring in a first avionics device out of the avionics devices, cause a second avionics device different from the first avionics device to control, using the power line communication, a first control target which has been controlled by the first avionics device out of the control targets, wherein
the power line communication includes superposing communication signals on a power in the power line to transmit and/or receive data.

2. The aircraft according to claim 1, wherein the second avionics device is not connected with the control targets via the signal lines, and is connected with the control targets via the power line to communicable with the control targets with the power line communication.

3. The aircraft according to claim 1, wherein the second avionics device has controlled a second control target of the control targets different from the first control target which has been connected with the first avionics device since before the occurring of the abnormality.

4. The aircraft according to claim 2, wherein the second avionics device other has controlled a second control target of the control targets different from the first control target which has been connected with the first avionics device since before the occurring of the abnormality.

5. The aircraft according to claim 1, wherein each of the first power line communication unit and the second power line communication unit functions as a modem to transmit and/or receive the data with the power line communication to and from another power line communication unit.

6. An aircraft comprising:
control targets each comprising a power line communication unit configured to perform power line communication via a power line;
avionics devices respectively connected with the control targets via exclusive-use signal lines, the avionics devices being configured to control the control targets via the signal lines, the avionics devices each comprising a power line communication unit configured to perform the power line communication via the power line; and
circuitry configured to, based on an abnormality occurring in a first avionics device out of the avionics devices, cause a second avionics device different from the first avionics device to control using the power line communication, a first control target which has been controlled by the first avionics device out of the control targets, wherein
the power line communication includes superposing communication signals on a power in the power line to transmit and/or receive data.

* * * * *